(12) United States Patent
Eteläperä

(10) Patent No.: US 6,262,735 B1
(45) Date of Patent: Jul. 17, 2001

(54) UTILIZING THE CONTENTS OF A MESSAGE

(75) Inventor: Esa Eteläperä, Kulmuntinpolku (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/185,782

(22) Filed: Nov. 4, 1998

(30) Foreign Application Priority Data

Nov. 5, 1997 (FI) ........................................ 974141

(51) Int. Cl.⁷ ..................................... G06F 13/00

(52) U.S. Cl. ..................... 345/357; 345/335; 345/145

(58) Field of Search ........................ 345/335, 357, 345/145, 333, 348, 326; 379/93.05

(56) References Cited

U.S. PATENT DOCUMENTS

| | | | |
|---|---|---|---|
| 4,791,556 | * 12/1988 | Vilkaitis | 345/348 |
| 5,189,632 | 2/1993 | Paajanen et al. | 364/705.05 |
| 5,442,742 | * 8/1995 | Greyson et al. | 707/539 |
| 5,583,921 | * 12/1996 | Hidaka | 379/93.05 |
| 5,627,948 | * 5/1997 | Fukunaga | 358/1.12 |
| 5,692,032 | 11/1997 | Seppanen et al. | 379/59 |
| 5,790,875 | 8/1998 | Andersin et al. | 395/750.03 |
| 5,794,142 | 8/1998 | Vanttila et al. | 455/419 |
| 5,815,138 | * 9/1998 | Tsubaki et al. | 345/145 |
| 5,987,029 | * 11/1999 | Kotani et al. | 370/389 |
| 6,026,233 | * 5/1997 | Shulman et al. | 717/1 |
| 6,044,250 | * 3/2000 | Kuramatsu et al. | 455/130 |
| 6,049,796 | * 4/2000 | Siitonen et al. | 707/3 |

FOREIGN PATENT DOCUMENTS

| | | |
|---|---|---|
| WO 95/34998 | 12/1995 | (WO) . |
| WO 97/32439 | 9/1997 | (WO) . |

* cited by examiner

*Primary Examiner*—Raymond J. Bayerl
*Assistant Examiner*—Tadesse Hailu
(74) *Attorney, Agent, or Firm*—Perman & Green, LLP (57) ABSTRACT

The scope of the present invention is a device and a method for the utilizing of information contained in a character-based message in a device having several different applications. In the method a character-based message is received, and the message is displayed to the user. The user is allowed to point out a position in the message, whereby a certain character combination is searched for in the proximity of the position pointed out by the user. Upon finding the character combination, the usability, in one of the applications of said applications, of the character combination found in the message is recognized, and based upon the recognition a command is generated for activating said application and for using the information contained in said character combination found in the message in said application.

10 Claims, 5 Drawing Sheets

UTILIZING THE CONTENTS OF A MESSAGE

FIELD OF THE INVENTION

The present invention relates to a method for utilizing information contained in a character-based message in a device comprising several applications. Correspondingly the invention relates to a device for handling applications.

BACKGROUND OF THE INVENTION

A function is prior known from the user interface of a mobile telephone, by using which function a telephone number can be picked from a received text message to the display of the mobile telephone, after which pushing a Call-button (Send button, lift handset) activates a call to said telephone number. As an example of this it is assumed that a short-message arrives to a mobile telephone, which message contains a telephone number, for example:
Message in answering machine (1 speech, 0 fax)
Call +358-50-555 123456

In such a case for example using Nokia 2110 mobile telephone said message can be read in the display of the telephone and the menu comprises command "Pick number", after which in response to this command, an application locates the number from within the message, copies it to the memory means, clears the display and pastes said telephone number from the memory means into the display, in which case the display shows only the telephone number, i.e.
+358-50-555 123456
to which a call can be activated by pushing the Call-key. The problem of this existing function is however that it only operates when calling numbers are to be picked from text messages.

Nowadays such so called communicators are known which, in addition to conventional mobile telephone functions, include a data processing section facilitating e.g. maintaining a calendar, sending a facsimile message and transmitting E-mail and for example the browsing of WWW-pages (World Wide Web). An example of such a device is Nokia 9000 Communicator. Also conventional mobile telephones are beginning to include several applications.

Such a device comprises several different applications (such as listed above) and facilitates contacting a certain address over several different applications and it facilitates entering data into the different applications. In such a case it is possible to send information relating to different applications using text messages. The user of a communicator may receive for example a message as follows: "Meeting next Friday at 13 o'clock in room Red. The location of the room can be familiarized with on; URL address. Call +358 3 123 4567 if the time does not suite you."

Having received the message the user of a communicator performs a number of task steps using his device, for example as follows:
1) Opens a calendar application
2) Selects the date of next Friday
3) Checks whether time 13:00 is free
4) If the time is suitable, the user returns to the text message application in order to read the contents of the text message
5) Copies the URL-address (Uniform Resource Locator) from the text to the clipboard
6) Opens a WWW-page browser
7) Pastes the URL-address from the clipboard to the URL-box of the WWW-page browser
8) Initiates a connection to the URL-address and after receiving the WWW-page on a page of the device, reads the location information.

Alternatively, step 3) is followed by steps 4a)–8a) instead of steps 4)–8):
4a) If the time is not suitable, the user returns to the text message application to read the contents of the message
5a) Copies the telephone number (+358 3 123 4567) to the clipboard
6a) Opens the telephone application
7a) Pastes the telephone number to a number to be called-field
8a) Initiates a call (for example using Call-button)

In this way the user of such a device has to perform quite a number of operations if a received text-message contains information relating to different applications.

SUMMARY OF THE INVENTION

Now such a device and a method has been invented, with which the utilizing of information from a character-based message relating to different applications is made more convenient compared with the above. The invention relates to a device which is capable of supporting several different applications and which is capable of receiving and displaying different character-based messages and which device has means for searching certain character combinations in a character-based message and means for recognizing character combinations connected with the different applications in said character-based message, which message may comprise character combinations connected with several different applications, and means for activating or launching an application determined by a certain character combination contained in said message, based upon said character combination and for executing the command connected with said character combination in the activated application.

The search of a character combination in a device according to the invention is realized preferably in such a way that the user of the device is allowed to move the cursor in said character-based message, said character-based message has preferably been divided into different lines, in which case the line is searched on which the cursor is at the moment, and a combination connected with any of the applications is searched for. The search can be limited to concern only a certain number of characters around the cursor, for example 10 characters to the left and to the right of the cursor. It is possible to proceed in such a way when it is assumed that the user recognizes said application-specific character combinations in a message, i.e. the user is expected to set the cursor on said character combination, in which case the device (the program in it) registers the character combination by reading the surroundings of the cursor.

The executing of the command determined by a character combination is performed in a device according to the invention preferably in such a way that the user tells the program that the user wants the command menu to be displayed, in which case the program at first performs the above presented search of the character combination and adds the command based upon the character combination found the search to the command menu, after which the command menu is brought in the display for viewing by the user, from which menu the user can select a command to be executed. When the user does this, the program activates the application determined by the command and executes the function according to the command in the activated application.

The invention preferably relates to a device suited for mobile communication comprising or being capable of supporting several different applications, comprising for example both communication applications (such as call, facsimile, E-mail) and organizer applications (such as address information, calendar, memo (notepad)) and in which communication device a program automatically picks from a character-based message, stored in the device or arriving to it, certain information in order to be used as a command in another application. Such commands can be for example a call to a certain telephone number, a facsimile transmission to a certain telephone number, sending of electronic mail to a certain address, checking or updating of a calendar at a certain date and time.

A character-based message means in this context a message which is displayed to the user in characters. Thus the invention comprises messages formed of ASCII-characters, and facsimile messages formed graphically, for example as a bit map, which all in any case can be shown to the user, for example in a display, in characters.

According to a first aspect of the invention there is provided a method for utilizing, in a device having several different applications, information contained in a character-based message, which method comprises receiving a character-based message, displaying the message to the user, the method being characterized in that it comprises allowing the user to point out a position in the message, searching for a certain character combination in the message in the proximity of the position pointed out by the user, upon finding the character combination, detecting the usability, in one of the applications of said applications, of the character combination found in the message, and based upon the detection generating a command for activating said application and for using the information contained in said character combination found in the message in said application.

According to a second aspect of the invention there is provided a device for handling applications, comprising a processor for controlling several different applications, a memory for storing applications as software, means for receiving character-based messages, and a display for presenting the character-based message to the user, and the device being characterized in that it comprises means for allowing the user to point out a position in the message, searching means for searching for a certain character combination in said character-based message in the proximity of the position pointed out by the user, detection means for detecting, in response to said searching means finding said character combination, the usability of said character combination found in the message for use in one of the applications of said applications, and means for generating a command based upon the detection by said detection means, for activating said application and for utilizing in said application the information contained in the character combination found in the message.

The activating of an application can be executing an application or bringing an already activated, but running in the background, application in the display of the device for the receiving and executing of a command.

BRIEF DESCRIPTION OF THE DRAWINGS

The invention is described in detail in the following with reference to enclosed figures, of which

DETAILED DESCRIPTION

The invention is suited for use in such a device intended for mobile communication which comprises, or is capable of supporting, several applications, comprising for example both communication applications (such as call, facsimile, electronic mail) and organizer applications (such as address information, calendar, memo). The device further is preferably handheld. An example of such a device is for example Nokia 9000 Communicator. Such a device is preferably capable of receiving at least one of or some of the following character-based messages: short messages, electronic mail-messages, text files (for example as a data file transfer during a data call using a terminal connection) or WWW-pages from Internet. A character-based message may be received wirelessly for example by radio from a mobile communications network, or over an infrared connection from a computer, or a message can be received over a wired connection from another device or as a file transfer from a network or from a diskette. From any of such character-based messages the device searches for certain information in order to be used as a command in another application. Such commands may be for example a call to a certain telephone number, initiating of a facsimile transmission to a certain telefax number, initiating of an E-mail transmission to a certain address, checking or updating of a calendar at a certain date and time. The different combinations of characters the program is searching for have been predetermined in the device and stored to the memory of the device. A user may also be allowed to edit a character combination table, i.e. to update and create new combinations of characters in the table. The program realizing the invention is here called a CSA-engine (Context Sensitive Actions).

Table 1 below gives an example of such character combinations and commands. Table 1 presents in first column from the left examples of character combinations to be searched for, in the second column commands to be generated based upon the character combination (which are displayed for the user in a menu), the third column describes briefly the action to be performed based upon the command and the fourth column presents examples of character combinations according to the invention to be searched for.

TABLE 1

| | Combination of characters | Command (in display) | Description | Example |
|---|---|---|---|---|
| 1 | tel $n | call $n | Call number $n | tel +358 3 285 6800<br>tel (3) 285 6800 |
| 2 | fax $n | fax $n | Open in the facsimile application the transmission form in which $n is the receiver's facsimile number | fax +358 3 285 6888<br>fax (3) 285 6888 |
| 3 | http:$s | web http:$s | Establish web-connection to address http:$s | http://www.nokia.com |
| 4 | $s. $s. $s | web http:// $s(1). $s(2). $s(3) | Establish web-connection to address http://$s(1). $s(2). $s(3) | www.nokia.com |
| 5 | $s @ $s | mail $s(1) @ $s(2) | Open in the E-mail application the transmission form in which $s(1) @ $s(2) is the receiver's address | mickey.mouse @ disney. com |
| 6 | Monday \| Tuesday \| Wednesday \| Thursday \| Friday \| Saturday \| Sunday \| tomorrow | calendar $s | Open calendar at next day of week:$s | Friday |
| 7 | $d$t | calendar $d$t | Open calendar at day $d and time $t | 11-Feb-1997 12:15 |

Row 1 presents an example of a character combination for making a call and line 2 presents an example of a character combination for transmitting a facsimile message. No prefix (tel, fax) is necessarily needed, but the commands could be executed in such a way that when the program recognizes a character combination to be a telephone number, it generates both a call- and a fax-command in the menu, in which the user can activate the one the user desires. Lines 3–4 present examples of character combinations and commands generated based upon them, with which in a WWW-browser application an Internet connection to a certain address can be initiated/activated, i.e. in order to fetch a certain WWW-page. The address can be in the so-called URL-format or in another address format of the telecommunication network, such as IP-address format. Line 5 presents an example of making the transmitting of E-mail easier when by means of a command the electronic mail application can be activated and further opening a E-mail message readily containing the address of the recipient, which address is picked from the original message. Lines 6–7 present examples of how a calendar is opened based upon a weekday or another identifier at a place defined by a character combination. The invention is preferably realized in such a way that when minor typing errors occur, the program compares whether a character combination closely corresponds to any character combination in the table, in which case the program generates a command based upon an estimation. The program can be arranged to get a confirmation from the user whether the information is correct and to allow the user to modify the information, for example to allow editing a telephone number brought to the menu if the user detects an error in it. In order to allow minor errors it is possible to store some rules, according to which the program interprets characters and character combinations in a message. The rules may include removal of a character in the middle of a set of numbers, in which case the program assumes that the character combination is intended to be a telephone number. In such a case for example from character combination "+358 3 123H4567" the program can beforehand remove the letter H and present to the user the command "Call +358 3 1234567" with the possibility to alter the number prior to executing the command. Correspondingly, the program may have other kinds of rules, for example format rules for interpreting of dates and times. In this way, even if a message should read "98.01.25" or 25.01.98" or "Jan. 25, 1998, the program would understand the date and would be able to open the correct day in the calendar. This can be done for example in such a way that all different alternatives have been taken into account when forming the table having the information for converting a date into such a format the calendar application understands. Alternatively the calendar application is capable of receiving a date in any format. In a corresponding way the program is capable of interpreting times written in different ways, for example "13:17" or "1.17 PM".

Figure 1A:
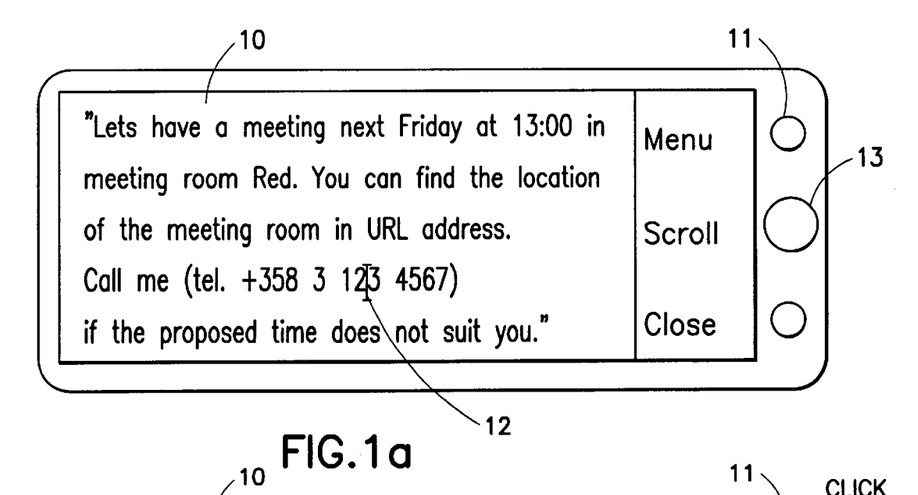
FIGS. 1a, 1b and 1c present the forming of a command in a menu based upon a combination of characters contained in a text.
Figure 1B:
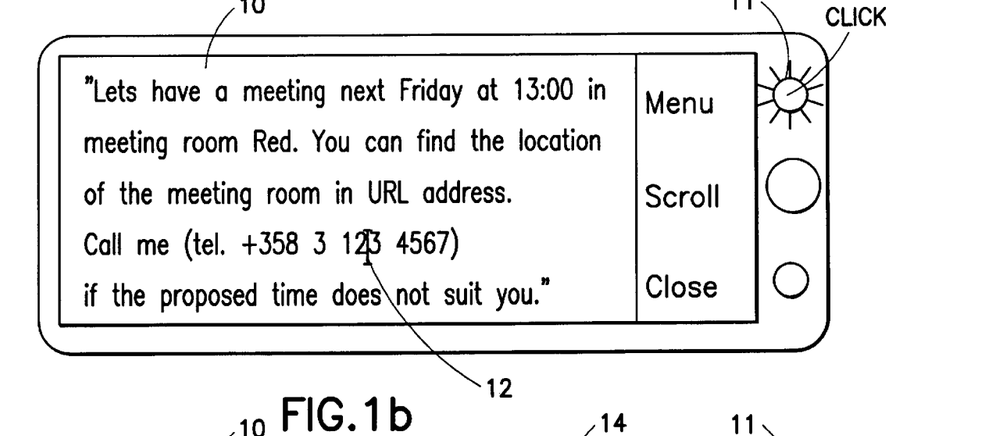
Figure 1C:
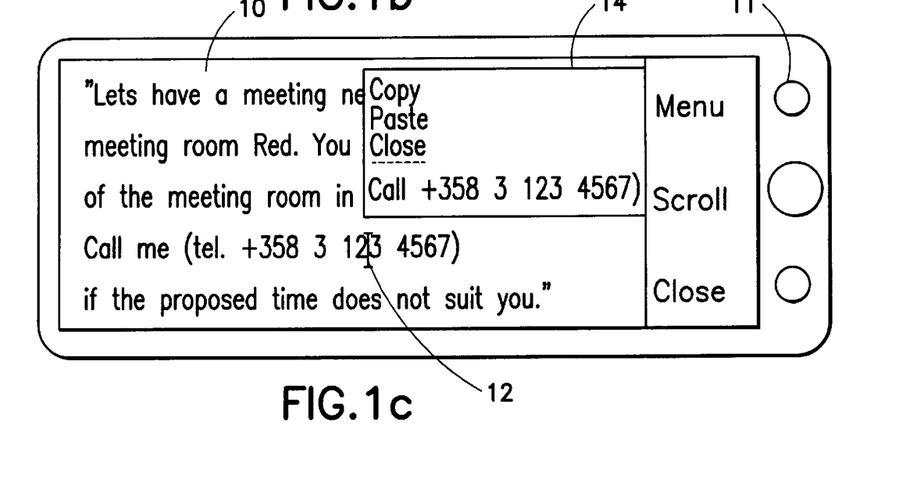
Figure 2:
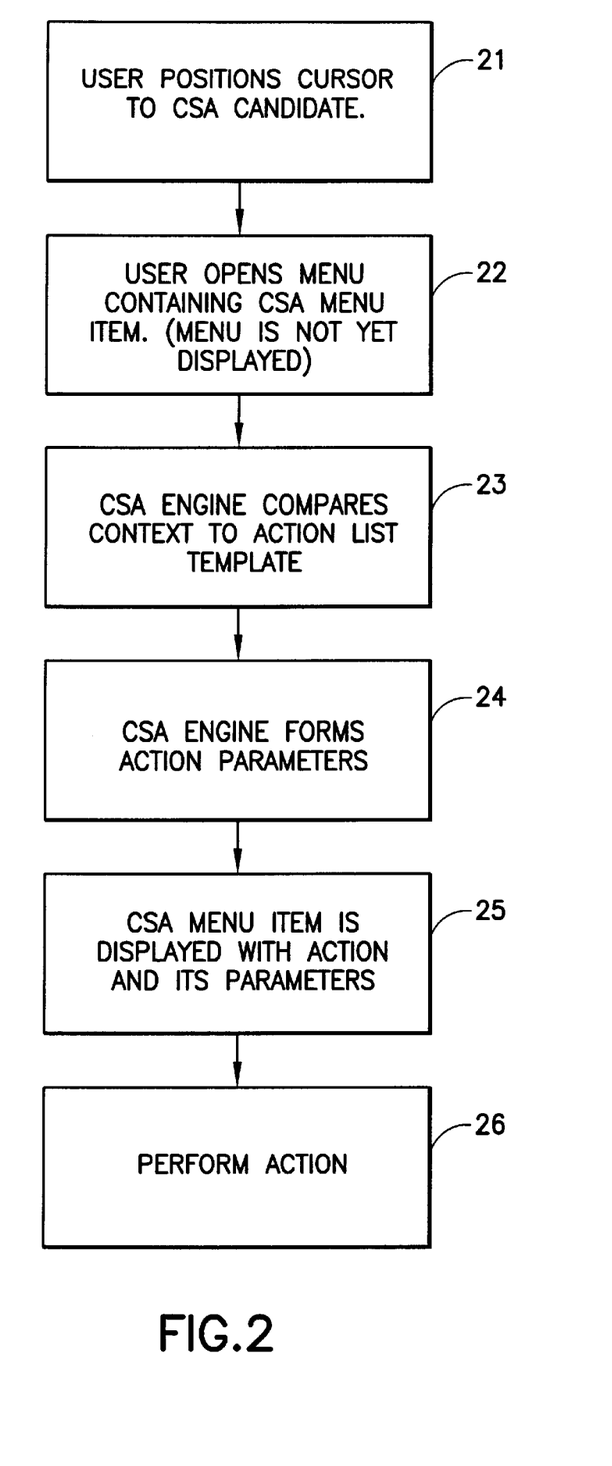
FIG. 2 presents in the form of a flow diagram steps connected with the forming of a command.
Figure 3:
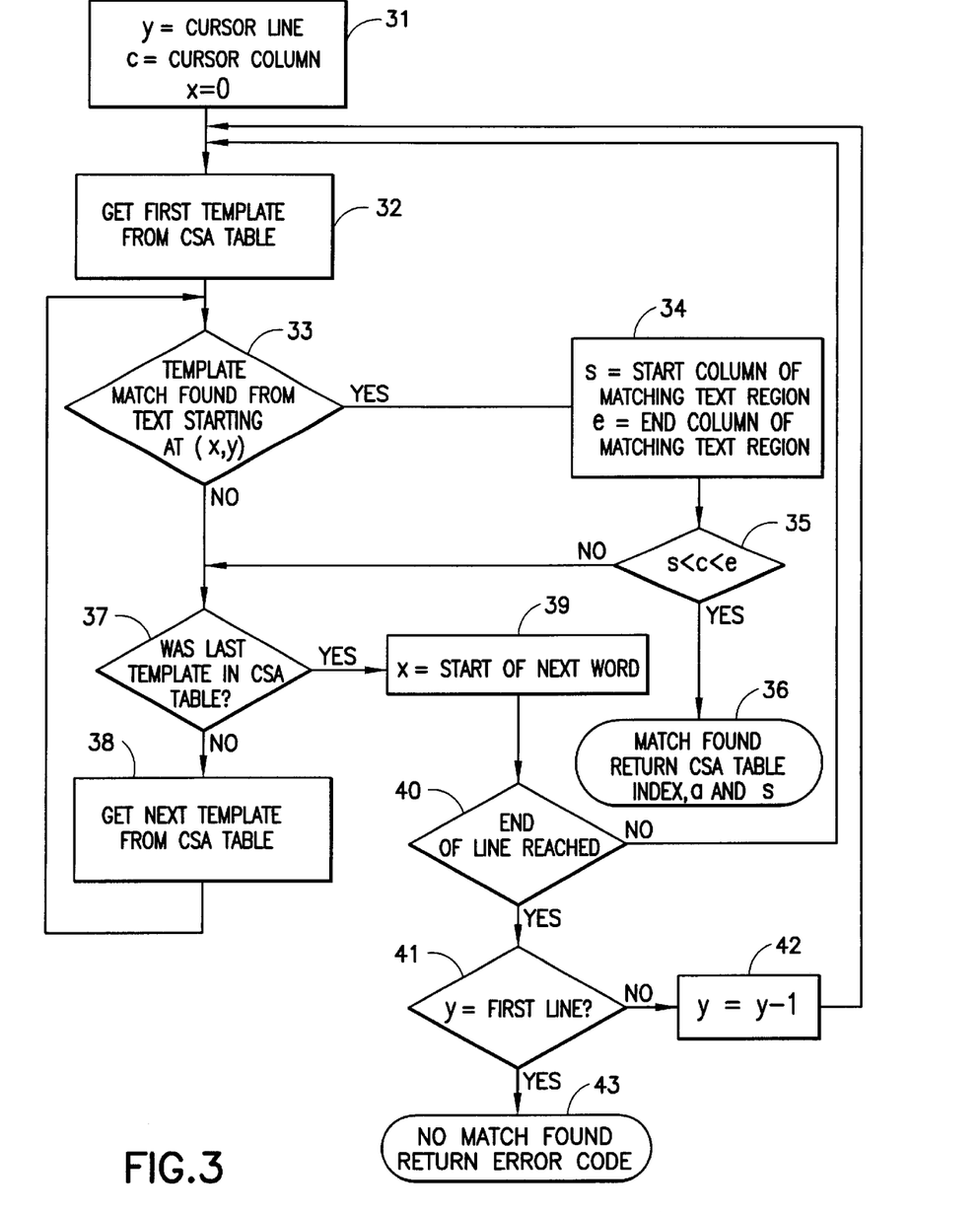
FIG. 3 presents in the form of a flow diagram steps connected with the search for a certain combination of characters.

FIGS. 1a–1c present an example of the searching for a character combination (in this case a telephone number) in a character-based message and of the generating of a command in a menu according to a certain character combination. FIGS. 2–3 present an example of the steps performed when searching for a character combination and generating commands. FIGS. 1a–1c present an example of the user interface of a device according to the invention comprising display 10 and keys. The user interface can be of any kind, for example a user interface of a normal mobile telephone. FIG. 1a presents a character-based message in display 10 of the device. The search for a certain character combination can be realized in such a way that the whole text is searched and character combinations of a predetermined format are looked for, and each one of such character combinations are picked from the message. If the text is long, searching the whole message may be slow.

In order to speed up the search, the search for a certain character combination is preferably realized in such a way that the user is allowed to point any desired character combination in a message. This can take place by allowing the moving of cursor 12 in said character-based message, in which case the cursor functions as a character combination pointer. The moving of the cursor is performed using e.g. cursor keys or control ball 13. The search for a character combination can be speeded up in such a way that it is first searched the line the user is pointing, i.e. on which cursor 12 is situated at the moment and a search for any of certain character combinations is performed on this line. The pointing could be done by touching the display at the point in question, if a touch-sensitive display is used. The search can be limited to concern only a certain number of characters in the proximity of the cursor, for example 5 to 10 characters to the left and to the right of cursor 12. This procedure can be used when it is assumed that the user recognizes said application specific character combinations in a message, i.e. the user is expected to place the cursor at the character combination in question, in which case the device (a program in it) registers the character combination by reading the surroundings of the cursor. An example of this is presented in FIG. 1a.

The following is the explanation of the main steps of the method for the search of a character combination and for generating a command with reference to FIG. 2 and using as an example a situation in which the pointing of a character combination is accomplished by moving cursor 12 to the desired character combination. When cursor 12 is at the desired character combination (step 21, FIG. 2) the user informs the program that he wants the command menu to be displayed for example by pushing menu-key 11 (step 22). This situation is presented in FIG. 1b. It is not until now that the device (the CSA-engine in it) performs the above presented search for the character combination (step 23), generates a command based upon the character combination found in the search (step 24) and includes the command in command-menu 14, which is brought in the display (step 25) to be viewed by the user, in which the user can activate the command to be executed (step 26). This situation is presented in FIG. 1c. When the user proceeds in this manner, the program activates the application determined by the command and the activated program executes the function according to the command, i.e. in the situation in FIG. 1c the device would go over to the telephone application and initiate a call to number +358 3 123 4567. This takes place in such a way that the CSA-engine transfers the command with eventual parameter to the application, which executes the command.

The following is a more detailed explanation of the search for a character combination with reference to FIG. 3. In step 31 the cursor has been set on line y, position c, and the starting point of the line in question is represented by position x=0. In step 32 a first a character combination is retrieved from a CSA-table (for example a table like Table 1, in which character combinations and commands to be executed have been defined). In step 33 it is searched whether the character combination in question can be found on the line by starting the search from position (x, y). The search can take place by interpreting the line character by character.

If the answer to the question of step 33 is yes, i.e. the corresponding character combination was found (for example on the line concerned or within a certain range on the line) a move to step 34 takes place, in which step it is searched for the start and end points of the character combination (by scrutinizing for example spaces or the combinations of spaces and parentheses), and it is determined s to be said starting point and e to be the end point. In step 35 it is verified that the cursor (i.e. position c) certainly is at the character combination in question by researching whether cursor position c is between start- and end points s and e of the character combination. In this way it is made sure that the correct character combination intended by the user is picked, in case for example two character combinations are found on the same line in the proximity of the cursor. If the cursor is within the character combination, it is moved to step 36, in which case the program states that it has found a certain character combination and restores in form of values the index of the character combination in the table (for example number 1, see Table 1) and in addition to it for example the start- and end points s and e.

If the answer to the question of step 33 is no, i.e. the corresponding character combination was not found on the line concerned or within a certain range on the line, it is moved to step 37, in which it is researched whether the comparison character combination picked in the table was the last one. If not, the next character combination to be compared with is retrieved from the table in step 38 and a return to step 33 takes place. If the character combination to be compared with was the last one in the table, in step 39 it is moved over to research the range after the already searched area (for example 15 characters). In step 40 it is researched whether it was moved to a position at which the line ends. If the line did not end, new searches are made again on the new area starting from step 32. If the line ended, the search can be stopped and a return directly to step 43 can take place by stating that no predetermined character combination was found. Alternatively, the other lines of the character based message can be searched for example by reducing (step 42) or increasing (not shown but alternative to step 42) line-value y, unless it is stated in step 41 that all lines already have been searched. When a line to be searched is changed a return to step 32 takes place. The adding of steps 41 and 42 slows down the searching because even lines other than the one on which the cursor is have to be searched. These steps 41 and 42 can preferably be omitted in order to make the search quicker assuming that searching the line pointed by the user, i.e. cursor line, is sufficient.

The above is a description of one way of performing a search for a predetermined character combination. Naturally a search can be made in some other way without deviating from the invention, for example by searching in a message for a character combination in a table by starting from the beginning of the word the cursor is on and by moving word by word forwards or backwards in the text.

Figure 4:
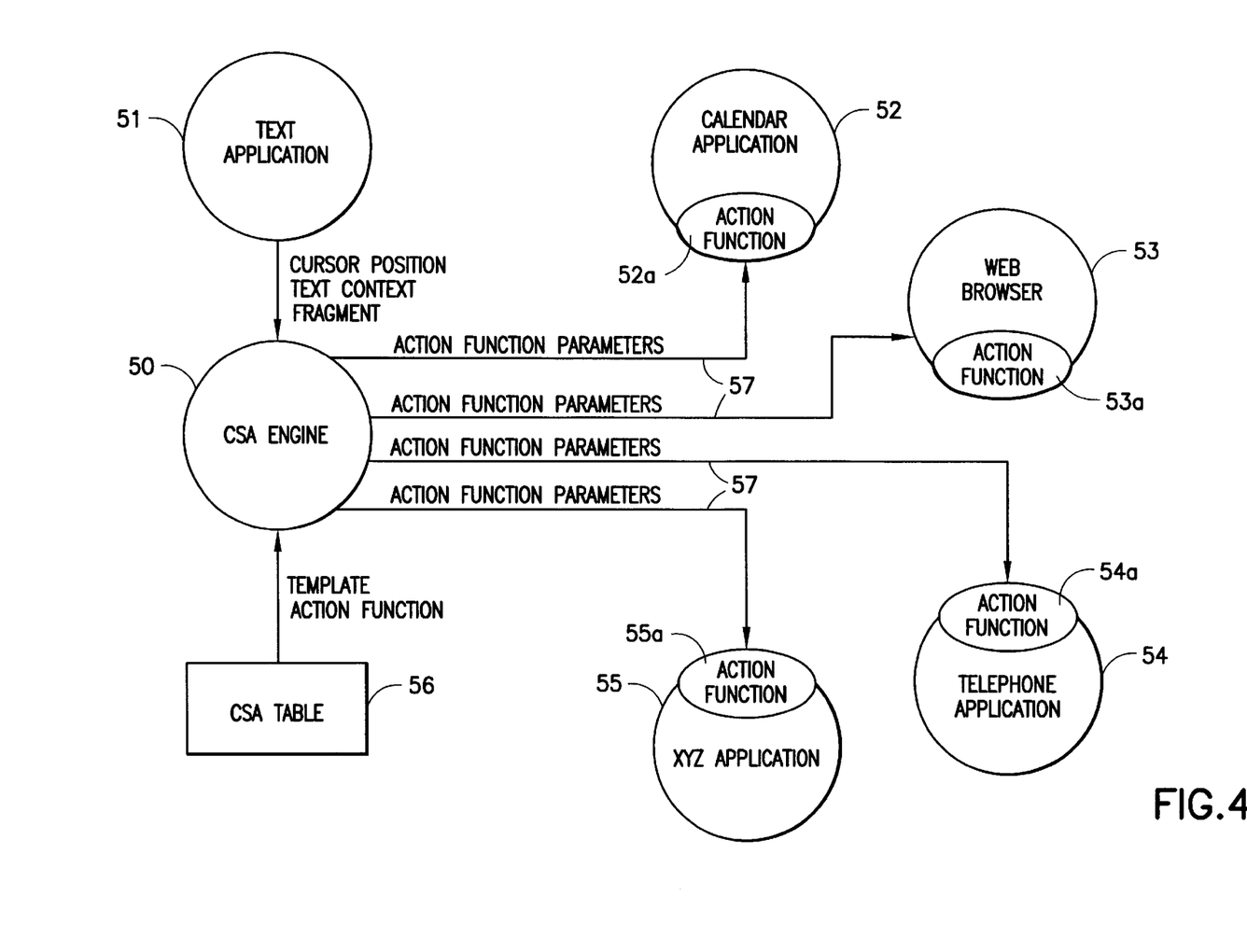
FIG. 4 presents the functional structure of a device according to the invention concerning the execution of commands.

The following is the description of the functional structure of the invention with reference to FIG. 4. The central element in the realizing of the invention and in the controlling of the functions of a device according to the invention is CSA-engine 50, which preferably is realized using a program and the program is run in a processor in the device. Also applications 51–55 of the device are realized using a program. The processor also runs these application software programs 51–55, which have been stored in a memory connected with the processor. Application specific character combinations and the commands to be executed based upon them are stored in form of table 56 in the memory of the device, from which the CSA-engine can pick the command to be executed based upon a character combination. In short, in the invention CSA-engine 50 searches for predetermined character combinations in a character-based message, for example in some text application 51. When it has found one of the character combinations of table 56, CSA-engine 50 retrieves from table 56 the function command and -parameter 57 corresponding to it and generates a command for application 52–55 defined in the table, in which case receiving application 52–55 is activated and utilizes received parameter 57 for the executing of the received command. FIG. 4 presents as receiving applications calendar 52, WWW (World Wide Web)-browser 53, telephone application 54 and imaginative XYZ-application 55. These applications comprise section 52a–55a, which is capable of receiving commands which are executed by the application. CSA-engine 50 generates for example the command Send_message(Application, Command, Parameter), i.e. sends to the application determined by the Application-term a message which gives the application an instruction to execute the command Command using as a parameter the term Parameter (comprising one or several parameters). In this case the message Send_message(TEL_APPL, make_call, +358 3 123 4567) activates the telephone application to make a call to the number in question.

Figure 5:
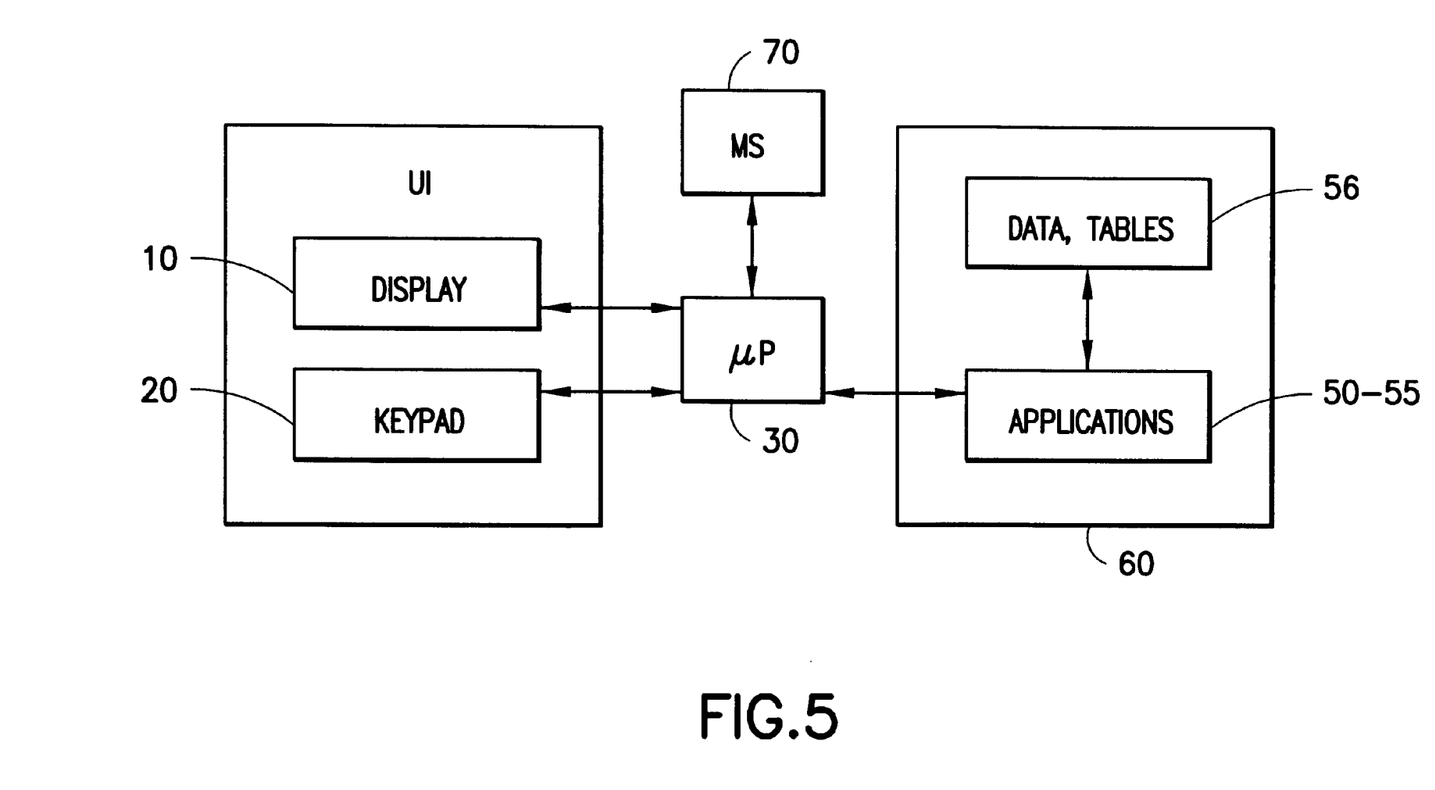
FIG. 5 presents the block diagram of a device handling applications.

FIG. 5 presents a block diagram of the parts of a device handling applications for the executing of a method according to the invention. The operating of the device is controlled by processor 30, which controls display 10 and keys 20 of user interface UI, and possible communication part 70, which can be a transceiver according to a mobile communications system. Memory 60 is in connection with processor 60, which memory can comprise volatile and non-volatile memory. Programs and data are stored in memory 60, for example table 56, for applications 50–55. The programs can control (run by the processor) other programs or transfer data between different programs, like the CSA-engine does in a way presented in FIG. 4.

The invention makes it easier to pick information from a character-based message to be used as a parameter in an action to be performed. The invention makes the operation and using different applications easier in a device having several different applications. In a preferable embodiment of the invention the searching of a certain character combination becomes quicker, when the program performs a search in a pointed place instead of scanning the whole message. The device generates for the user in a menu commands based upon character combinations in the character-based message, in which case the execution of a command is easy with just one key press. A command is automatically generated in a menu when the user opens the menu. The information (which often is a kind of parameter) in the character-based message is linked to one of the applications, i.e. the device generated commands linked to a certain application. Because a parameter already is linked to an application and to a command executed in the application, it is easy for the user to execute a command using just one selection (by pressing a key). The user neither needs to care about which application he is presently using, but independently of the application the device goes over, in response to the pressing of a key, to the application determined by the command in the menu and executes the function according to the command.

The above is a description of the realization of the invention and its embodiments utilizing examples. It is evident to persons skilled in the art that the invention is not limited to the details of the above presented embodiments and that the invention can be realized also in other embodiments without deviating from the characteristics of the invention. The presented embodiments should be regarded as illustrating but not limiting. Thus the possibilities to realize and use the invention are limited only by the enclosed claims. Thus the different embodiments of the invention specified by the claims, also equivalent embodiments, are included in the scope of the invention.

What is claimed is:

1. A method for utilizing, in a device having several different applications, information contained in a character-based message, which method comprises
    receiving a character-based message,
    displaying the received message to the user,
wherein the method comprises
    allowing the user to point out a position in the received message,
    searching for a certain character combination in the received message in the proximity of the position pointed out by the user,
    upon finding the character combination, detecting the usability, in one of the applications of said applications, of the character combination found in the received message, and
    based upon the detection generating a command for activating said application and for using the information contained in said character combination found in the received message in said application.

2. A method according to claim 1, wherein the method comprises
    displaying the generated command to the user,
    allowing the user to select the command for the executing of the command, and
    in response to the selecting of the command activating said application and utilizing the information contained in said character combination found in the message in said application.

3. A method according to claim 2, wherein the method comprises
    transferring, in response to the selecting of the command, information about the operation to be executed and about the data to be used in the operation to said application, in which case
    the application is activated and it executes said operation utilizing said information.

4. A method according to claim 1, wherein it comprises
    displaying the message to the user divided on lines,
    allowing the user to point out a position on a line in the message, and
    performing said search for a character combination on the line pointed out by the user.

5. A method according to claim 1, wherein
    the pointing out of a position in the message is done using a cursor which can be moved by the user.

6. A method according to claim 1, wherein the method comprises
    displaying a generated command to the user in a command-menu, and
    in response to a command given by the user to open the command-menu for viewing, starting said actions for searching of a character combination and for detection of its usability and for generating of a command, and after generating of the command opening the command-menu comprising said command for viewing by the user.

7. A device for handling applications, comprising
    a processor (30) for controlling several different applications,
    a memory (60) for storing applications as software,
    means (10, 51, 70) for receiving character-based messages, and
    a display (10) for presenting the character-based message to the user, wherein the device further comprises
    means (12, 20) for allowing the user to point out a position in the message,
    searching means (50, 51) for searching for a certain character combination in said character-based message in the proximity of the position pointed out by the user,
    detection means (50, 51) for detecting, in response to said searching means finding said character combination, the usability of said character combination found in the message for use in one of the applications of said applications, and
    means (50, 56) for generating a command (57) based upon the detection by said detection means, for activating said application (52–55) and for utilizing in said application the information contained in the character combination found in the message.

8. A device according to claim 7, wherein it comprises
    means (11, 13, 20) for selecting said command (57) to be executed, and
    means (50, 52a, -55a, 30) for activating said application and for utilizing the information contained in the character combination found in the message in said application.

9. A device according to claim 7, wherein it is a mobile communication device comprising means (70) for wireless communication.

10. A device according to claim 7, wherein it comprises at least two of the applications selected from a group of applications including phone call application, facsimile application, short message application, electronic mail application, web connection application, calendar application and memo/notepad application.

* * * * *